United States Patent Office 2,963,372
Patented Dec. 6, 1960

2,963,372

PAN OIL COMPOSITION AND PROCESS OF MAKING SAME

Harry Brody, Highland Park, and Arne E. Fahlen, Chicago, Ill., assignors to Swift & Company, Chicago, Ill., a corporation of Illinois No Drawing. Filed Mar. 13, 1959, Ser. No. 799,092

8 Claims. (Cl. 99—118)

This invention relates to an improved fatty composition and to a method of making same. More particularly, this invention relates to a fatty material particularly adapted as a pan coating in the baking art.

Pan dressing, sometimes referred to as "pan grease" or "pan oil," is used by bakers to prevent baked goods from adhering to the pans in which they are baked. Such a dressing, properly applied, forms a film over that portion of the pan surface where contact is made by baked goods and prevents direct contact between the baked goods and the pan surface.

Some types of baked goods present a greater adherency problem than others. For example, cookies rich in fat require little or no pan dressing, while bread, which contains little fat but which also contains little sugar, requires an increased amount (about 1 gram per loaf). Cakes, which contain less fat than cookies but high quantities of sugar and, furthermore, are fragile and easily broken, require the use of a pan dressing containing substantial quantities of solids, such as wheat flour, soya flour, or starch. There are a number of preparations of such mixtures available to the baker, and some bakers make their own mixtures. One of the troublesome problems with these preparations is that of separation of the solids from the fatty material.

Additionally, there is a difference in pan releasing properties of various fats and oils. For example, lard oil is superior to vegetable oil, and lard is superior to hydrogenated vegetable oils. It is known that the addition of lecithin to fats and oils improves their releasing ability. However, lecithin is only slightly soluble in oils, and amounts greater than about 0.5% separate upon standing. Plastic and hard fats, of course, and oils thickened with such materials as beeswax will accommodate substantially greater amounts of lecithin because of their inherent thickness. However, this very thickness is a disadvantage in an efficient, uniform application of pan dressing.

Other means of preventing adherence of baked goods to pans have been practiced. For example, a compound of silicone may be spread on pans which are then subjected to heat to form a film or glaze which acts as a pan releasing agent for a number of bakings. Eventually, however, the silicone glaze is worn or chipped off requiring reglazing or the use of a small amount of pan dressing. When pans are stacked, one within the other, the silicone glaze on the upper rims tends to wear off or chip off more rapidly, leaving an efficient glaze only on the remainder of the pan. A method to extend the use of such glazed pans is to apply pan dressing on the upper rims only. Such a dressing should preferably have a high viscosity so that it will stay where sprayed and not flow to the bottom of the pan.

It is therefore an object of this invention to provide a pan dressing having superior pan releasing properties for any type of baked goods.

It is another object of this invention to provide a pan dressing having a high degree of stability or resistance to separation of the ingredients.

It is still another object of this invention to provide a pan dressing with increased pan releasing properties which may be used in any type of automatic or semi-automatic spraying or greasing equipment or may be applied manually.

It is a further object of this invention to provide a pumpable pan dressing from normally liquid or semi-fluid fatty material having stability of viscosity; that is, an ability to retain a high viscosity at higher temperatures while maintaining fluidity at lower temperatures.

It is a still further object of this invention to provide a pumpable pan dressing in which may be dispersed increased amounts of lecithin.

It is still another object of this invention to provide a method for preparing an improved pan dressing.

Additional objects, if not specifically set forth herein, will be readily apparent to those skilled in the art from the following description of the invention.

Briefly, this invention comprises the addition of a small amount of aluminum stearate and a small amount of lecithin to an oil or fat to produce an efficient pan dressing.

The most commonly used liquid fatty materials are vegetable oil and lard oil, although the scope of the invention is intended to cover any well-known or preferred fats and oils, including vegetable oils, hydrogenated vegetable oils, meat fats, and mineral oils, and mixtures of these materials alone or together with solids such as wheat flour, cornstarch, beeswax, etc. For example, liquid oils or hardened fats, such as soybean oil, partially hardened soybean oil, cottonseed oil, partially hardened cottonseed oil, lard, lard oil, and beef fat, alone or as mixtures, may be used.

The aluminum stearate is dispersed thoroughly in the liquid fatty material prior to heating. The mixture is then heated to form a clear solution. While there is no critical time for dispersing the aluminum stearate in the oil, it is important that the mixture be held above the temperature at which it forms a clear solution to provide sufficient time to assure complete solution. Excessive holding time at elevated temperatures is undesirable from the standpoint of flavor and color of the end product. The method of incorporating aluminum stearate in oils is well known and is not a part of the present invention and, accordingly, the invention is not to be restricted to the particular method of incorporating aluminum stearate described above.

The mixture or solution of aluminum stearate and oil should not be unduly hot when the lecithin is added since lecithin heated toward the melting range of aluminum stearate darkens in color and may develop undesirable flavors. Lecithin goes readily into solution in the warm mixture. We have found satisfactory operating temperatures for dissolving the lecithin in the mixture to be about 90° F. to 150° F., although the invention is not to be restricted to these specific temperatures since any temperatures may be used as long as they are high enough to get the lecithin in solution and yet not so high as to cause impairment of flavor and color.

The amount of aluminum stearate may range from about 0.5% to about 5% and preferably about 2% to 5% based on the total weight of the mixture and is added to and dispersed in the fatty material while at a temperature range of between about 60° F. and about 150° F. The mixture is then heated until a substantially clear solution is formed (about 200° F. to 270° F.). The lecithin is advantageously dispersed in the mixture at a reduced temperature of between about 110° F. and about 150° F. On cooling further, the mixture increases in viscosity and may be applied to baking pans manually or with any automatic or semiautomatic spray or greasing devices.

While the optimum temperature of solution for a particular batch of aluminum stearate will be substantially constant, it is emphasized that seldom will two or more lots dissolve satisfactorily at identical temperatures. This is due to the fact that most commercial preparations are mixtures of aluminum mono, di, and tristearates. The compounds which produce the most favorable results are those consisting primarily of mono and distearates. These compounds generally dissolve readily between about 200° F. and 260° F. While the presence of small amounts of the tristearates are tolerable, excessive amounts result in a reduction of resistance to separation of lecithin from the oil.

It has been found in accordance with the present invention that aluminum stearate in the mixture increases the amount of lecithin which may be incorporated in the mixture. For example, it has been found that the amount of lecithin which can be dissolved in a given oil is proportionate to the amount of aluminum stearate present. Tables 1 and 2 below show the amount of separation of lecithin in winterized cottonseed oil at 75° F. and 100° F. in the presence of various amount of aluminum stearate.

TABLE 1

| Quantity of Lecithin, Percent | Separation After 20 Days at 75° F., Percent | | | | |
|---|---|---|---|---|---|
| 10 | 90 | 80 | 40 | 1 | None |
| 5 | 95 | 50 | 1 | None | None |
| 4 | 96 | 5 | None | None | None |
| 3 | 97 | 2 | None | None | None |
| 2 | 98 | None | None | None | None |
| 1 | 99 | None | None | None | None |
| Quantity of aluminum stearate, percent | 1 | 2 | 3 | 4 | 5 |

TABLE 2

| Quantity of Lecithin, Percent | Separation After 5 Days at 100° F., Percent | | | | |
|---|---|---|---|---|---|
| 10 | 90 | 86 | 66 | 10 | None |
| 5 | 95 | 70 | 2 | None | None |
| 4 | 96 | 56 | 2 | None | None |
| 3 | 97 | 50 | None | None | None |
| 2 | 98 | 20 | None | None | None |
| 1 | 99 | 10 | None | None | None |
| Quantity of aluminum stearate, percent | 1 | 2 | 3 | 4 | 5 |

The physical properties of the fatty material-aluminum stearate-lecithin mixture are affected by the physical properties of the fatty material used. In general, fats which are normally liquid at room temperatures produce pan oils which are normally liquid at room temperatures and, likewise, plastic fats produce plastic pan greases having similar appearance but having superior pan release properties over ordinary pan greases. Also plastic pan greases of the present invention when melted are more viscous than ordinary melted plastic fats and show superior pan adherence and increased pan releasing properties.

Without restricting the invention to any particular theory, it is believed that the aluminum stearate has a solubilizing effect on the lecithin. A mixture of oil and aluminum stearate will hold more lecithin than a fatty material with identical viscosity containing no aluminum stearate. For example, in the case of a lard and a pan grease of the present invention having a winterized cottonseed oil base, both showing the same viscosity at a temperature of 100% F., the pan grease will hold substantially more lecithin than the lard. Also, as compared with ordinary fats, the plastic pan greases of the present invention when cooled to form crystals will hold larger amounts of lecithin.

For purposes of illustrating the invention, pan dressings were prepared containing varying amounts of aluminum stearate and lecithin. The formulas and properties of the products are tabulated in Table 3 below:

TABLE 3

| Fat or Oil | Percent Aluminum Stearate | Percent Lecithin | Appearance | Resistance to Separation | Pan Release |
|---|---|---|---|---|---|
| Lard oil | 0 | 0 | Clear oil | Good | Fair. |
| | 0 | 3 | do | Very poor | Excell. |
| | 0.5 | 0 | Sl. thick clear oil | Good | Fair. |
| | 0.5 | 3 | do | Fair | Excell. |
| | 3 | 0 | Thick clear oil | Excellent | Fair. |
| | 3 | 0.5 | do | do | Do. |
| | 3 | 3 | Thicker clear oil | do | Excell. |
| | 3 | 5 | do | Good | Excell. |
| | 5 | 3 | Very thick clear oil | Excellent | Excell. |
| Soybean oil | 0 | 0 | Clear oil | do | V. Poor. |
| | 0 | 3 | do | V. poor | Good. |
| | 0.5 | 0 | Sl. thick clear oil | Excellent | V. Poor. |
| | 0.5 | 3 | do | Poor | Good. |
| | 3 | 0 | Thick clear oil | Excellent | V. Poor. |
| | 3 | 0.5 | do | do | Poor. |
| | 3 | 3 | Thicker clear oil | do | Good. |
| | 3 | 5 | do | Good | Excell. |
| | 5 | 3 | Very thick clear oil | Excellent | Excell. |
| Hydrogenated soybean oil (iodine value 80) | 0 | 0 | Cloudy semifluid | Good | Poor. |
| | 0 | 3 | Semifluid | Poor | Good. |
| | 0.5 | 0 | Cloudy semifluid | Good | Poor. |
| | 0.5 | 3 | Semifluid | Fair | Good. |
| | 3 | 0 | Thick semifluid | Excellent | Poor. |
| | 3 | 0.5 | do | do | Poor+. |
| | 3 | 3 | Thicker semifluid | do | Good. |
| | 3 | 5 | do | do | Excell. |
| | 5 | 3 | Very thick | do | Good. |
| Lard | 0 | 0 | Plastic | do | Fair. |
| | 0 | 3 | do | Good | Excell. |
| | 0.5 | 0 | do | Excellent | Fair. |
| | 0.5 | 3 | do | Good | Excell. |
| | 3 | 0 | Pumpable | Excellent | Fair. |
| | 3 | 0.5 | do | do | Fair+. |
| | 3 | 3 | do | do | Excell. |
| | 3 | 5 | do | do | Excell. |
| | 5 | 3 | do | do | Excell. |

The above table shows the effectiveness of various quantities of lecithin as a pan release agent. The table also shows that oils containing lecithin only are subject to separation. The table further shows that oils containing lecithin and aluminum stearate have both good pan release properties and resistance to separation.

The following examples are intended to further illustrate the invention:

*Example I*

An improved pan dressing was prepared having the following composition:

Percent
Soybean oil _____ 96
Aluminum stearate _____ 2
Lecithin _____ 2

The aluminum stearate was dispersed in the soybean oil and heated until a clear solution formed (about 260° F.). The mixture was then cooled to 150° F. and the lecithin added with stirring until evenly dispersed.

*Example II*

Another dressing was prepared having the following composition:

Percent
Lard oil _____ 92
Aluminum stearate _____ 3
Lecithin _____ 5

The dressing was preparing according to the process described in Example I.

The mixtures resulting from Examples I and II, because of their stable viscosity, have the property of clinging to a hard smooth surface such as metal and serve when applied as pan dressings to form oleaginous films on the surfaces of the pans before bodies of dough are imposed thereon. Thus, upon subjecting the dough to baking, the dough is maintained out of contact with the pan surface and, thus, is prevented from adhering thereto. The product of this invention may be utilized to form a film over the entire inner surface of the pan or, in the case of those having been glazed, only on the portions where the glaze has been worn or chipped away.

The present invention has the advantage of producing a pumpable mixture when using fats which are ordinarily plastic and unpumpable. Also smaller amounts of the pan grease of the present invention are required than ordinary fats and oils to produce an equivalent pan releasing effect.

Obviously, many modifications and variations of the invention as hereinbefore set forth may be made without departing from the spirit and scope thereof, and therefore only such limitations should be imposed as are indicated in the appended claims.

We claim:

1. A pan dressing comprising an edible fatty material having incorporated therein small but effective amounts of aluminum stearate and lecithin.

2. A pan oil of stable increased viscosity comprising a normally liquid edible oil having incorporated therein small but effective amounts of aluminum stearate and lecithin.

3. A pan dressing comprising an edible fatty material having incorporated therein at least about 0.5% aluminum stearate and at least about 0.5% lecithin based on the weight of the fatty material.

4. A pan dressing comprising an edible fatty material having incorporated therein from about 0.5% to about 5% aluminum stearate and from about 0.5% to about 10% lecithin based on the weight of the fatty material.

5. A method of producing a pan dressing which comprises adding a small but effective amount of aluminum stearate to a liquid edible fatty material, heating the mixture to form a solution, cooling the solution, and dispersing therein a small but effective amount of lecithin.

6. A method of producing a pan oil of stable viscosity comprising adding a small but effective amount of aluminum stearate to a normally liquid edible oil, heating the mixture to form a clear solution, cooling the solution, and dispersing therein a small but effective amount of lecithin.

7. A method of producing a pan dressing which comprises adding to an edible fatty material at least about 0.5% aluminum stearate based on the weight of the fatty material, heating the mixture to form a clear solution, cooling the solution, and then dispersing in said solution at least about 0.5% lecithin based on the weight of the fatty material.

8. A method of producing a pan dressing which comprises adding to an edible fatty material from about 0.5% to about 5% aluminum stearate based on the weight of the fatty material, heating the mixture to form a clear solution, cooling the solution, and then dispersing in said solution from about 0.5% to about 8.3% lecithin based on the weight of the fatty material.

References Cited in the file of this patent

UNITED STATES PATENTS

| | | |
|---|---|---|
| 2,418,668 | Royce | Apr. 8, 1947 |
| 2,559,481 | Truesdell | July 3, 1951 |